W. E. Lockwood.
Collar & Cuff.

No. 1981. Reissued June 6. 1865.

Witnesses:

Henry Houston

L. C. Foster

Inventor:

William E. Lockwood

UNITED STATES PATENT OFFICE.

WILLIAM E. LOCKWOOD, OF PHILADELPHIA, PENNSYLVANIA.

IMPROVEMENT IN LADIES' COLLARS AND CUFFS.

Specification forming part of Letters Patent No. 23,771, dated April 26, 1859; Reissue No. 1,981, dated June 6, 1865.

DIVISION C.

*To all whom it may concern:*

Be it known that I, WILLIAM E. LOCKWOOD, of Philadelphia, Pennsylvania, did obtain Letters Patent of the United States, dated the 26th day of April, 1859, for Improvements in Collars and Cuffs, and other Articles of Wearing-Apparel; that I deem the said Letters Patent inoperative and invalid, by reason of a defective and insufficient specification, and that I declare the following to be a full, clear, and exact description of that part of the said invention which consists of an ornamental collar or cuff made of a fabric composed of paper and muslin, or of an equivalent fabric, having a smooth white surface, ornamented by printing or by otherwise marking on the surface plain or colored devices.

In producing my new manufacture, I use a fabric composed of paper and muslin, or an equivalent fabric, having a smooth and polished or enameled surface to represent that of starched linen. I cut from this fabric pieces of the size desired for the ornamental collars, cuffs, or other articles of wearing-apparel, and print on the outer or exposed paper surface, or on both sides, if desirable, plain or colored devices, so as to impart to it an ornamental appearance, the printed designs being such, as regards color and pattern, as the manufacturer may consider best suited to the taste of the public.

Figure 1:
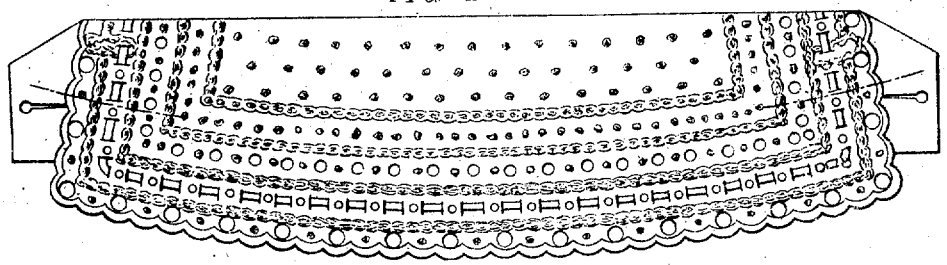
Figure 2:
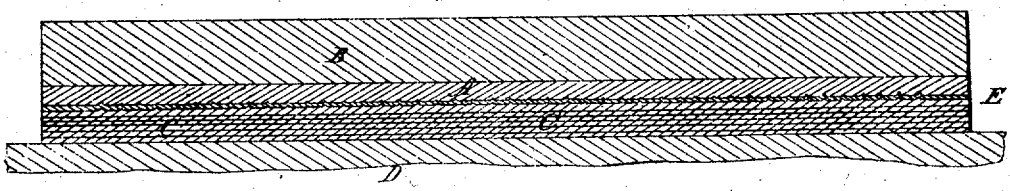

In the accompanying drawings, Figure 1 represents an embossed collar, on which are printed simple dots at intervals; but it will be evident that a plain paper collar can be ornamented by simply printing thereon plain or colored devices. Fig. 2 of the drawings represents a sectional view of the dies by means of which the collar or cuff may be embossed. As these dies have no relation to this part of the invention, it will not be necessary to describe them here.

It will be evident that my invention is applicable to shirt bosoms, &c.

I claim as my invention and desire to secure by Letters Patent, as a new article of manufacture—

An ornamental collar or cuff made of a fabric composed of paper and muslin, or of an equivalent fabric, ornamented by printing or otherwise marking on the surface plain or colored devices.

In testimony whereof I have signed my name to this specification before two subscribing witnesses.

Witnesses: WILLIAM E. LOCKWOOD.

HENRY HOWSON,

JOHN WHITE.